3,379,822
ELECTRIC CONDUCTOR SUITABLE FOR BEING SEALED IN THE WALL OF AN ELECTRIC DISCHARGE TUBE
Petrus Franciscus Antonius Haans, Theodoor Peter Johannes Botden, and Hendrik Roelofs, Emmasingel, Eindhoven, Netherlands, assignors to North American Philips Company, Inc., New York, N.Y., a corporation of Delaware
Filed July 2, 1965, Ser. No. 469,228
Claims priority, application Netherlands, July 18, 1964, 64—8,262
5 Claims. (Cl. 174—50.57)

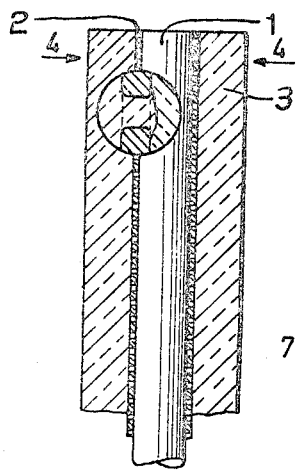
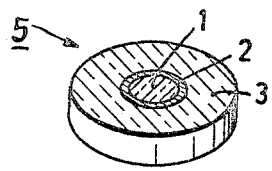
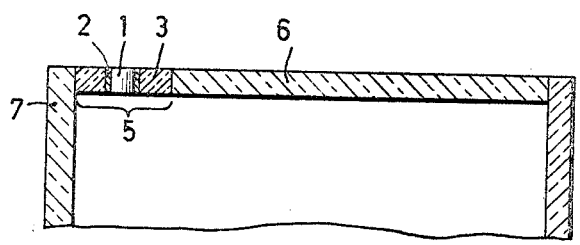
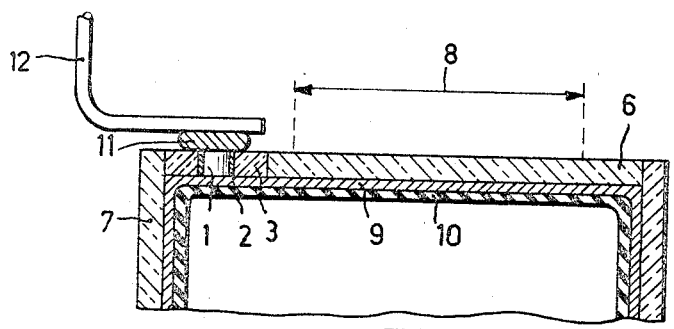
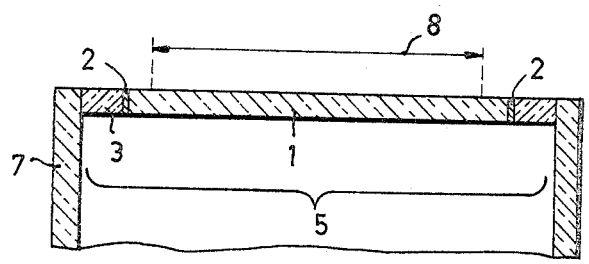

ABSTRACT OF THE DISCLOSURE

An electric conductor comprising a glass rod having a metal layer thereon less than 1 micron in thickness covered with glass which is sealed through the metal layer to the glass rod.

---

The invention relates to an electric conductor suitable for being sealed in the wall of an electric discharge tube consisting of a kind of glass having an expansion coefficient of less than $75 \times 10^{-7}$, for example quartz glass or a kind of glass known under the trademark of "Pyrex."

In order to avoid oxidation use is preferably made of a precious metal such as gold, platinum or iridium.

A direct sealing of the conductors of said metals in the said kind of glass to form a vacuum-tight through-connection is, however, not possible owing to the great difference in expansion coefficients between the metal and the glass and to an inadequate adhesion of the glass to said metals.

In a known construction the metal has been applied in the form of a thin layer to a glass rod. The glass of the rod had approximately the same expansion coefficient as the glass of the wall in which the conductor was sealed. Such a conductor, for example consisting of a thin platinum layer on a quartz rod, was directly sealed in the quartz wall of a discharge tube or lamp. During the sealing operation the temperature of the wall had to be higher than that of the rod of the conductor in order to avoid deformation of the conductor.

It has been found that such a construction may give satisfactory results, if the length of the sealing area is sufficient. With a seal in a thin glass wall it is found, however, that soon leakage occurs, particularly in the event of thermal shocks, since the glass of the wall does not adhere satisfactorily to the high-melting point noble metal of the conductive layer. Therefore the seal had to be made invariably with a length of at least 6 mms., which is undesirable in many cases.

With an electric conductor according to the invention this drawback is obviated by surrounding the conductive metal layer on the rod-shaped glass body with a tubular glass body, which is sealed at its inner side to the metal layer and to the rod-shaped glass body, while its outer side can be sealed to the glass of the wall of the electric discharge tube.

The length of the electric conductor according to the invention need be only 1 mm. It has been found that, since the glass tube surrounding the metal layer can be fused onto the thin metal layer at a comparatively high temperature, i.e. substantially in the liquid state, the glass of said tube adheres better to the metal and seals through the pores in the metal layer to the glass of the rod-shaped body. In spite of the small length of the sealing area, the vacuum tightness is maintained, even in the event of thermal shocks or mechanical forces. From tensile tests it has been found that breakage occurs always outside the conductor, in the glass of the wall. When sealing the outer side of the tubular glass body to the glass of the tube wall, the temperature may be lower than in sealing said tubular body to the metal layer, since a glass-to-glass connection is concerned here. There need occur only a small deformation of the tube wall, which may be obviated, if desired, by grinding, if the conductor has to be sealed in a glass window, for example of a television pick-up tube. Especially with a camera tube of the Plumbicon type this invention is important, since during the manufacture this tube has to be heated several times at 400 to 500° C., while the length of the conductor sealed in the window, which is equal to the thickness of the glass of the window is only about 2 mms.

An electric conductor according to the invention may be manufactured as follows:

A rod of for example quartz or Pyrex, having a diameter of for example 2 mms., is painted with a known platinum paste and heated so that a thin platinum layer of a thickness of less than $1\mu$, preferably about $0.1\mu$ is burnt into the glass surface. It is found that such a layer consists for about 15% of the surface of pores.

Then a tube, preferably of the same kind of glass, is slipped onto the metallised glass rod and connected at one end to a vacuum pump, whereas the tube is heated from the other end until the glass becomes locally thin-liquid and is urged onto the metal layer by the vacuum prevailing in the tube and is adhered thereto. Moreover, it is found that the glass seals through the pores with the glass of the rod, which is also heated very strongly. A deformation of the rod and of the metal layer is unessential, since afterwards pellets are severed from the rod to serve as conductors according to the invention, which are sealed in the tube wall. The metal layer need not always be applied like a sheath around the glass rod; it may consist of one or more strips. If the diameter of the glass rod is suitably chosen, a conductor severed from said rod may form itself the window of a discharge tube, whilst the conductive layer near the edge serves as a through connection.

The glass outer layer is then sealed to the wall of the discharge tube.

The invention will be described more fully with reference to the drawing, in which FIGS. 1 and 2 show conductors according to the invention, FIG. 3 shows part of a camera tube comprising a conductor as shown in FIG. 2, FIG. 4 shows part of such a discharge tube in the finished state and FIG. 5 shows a different embodiment of the invention.

As is shown in FIG. 1, a rod 1 of Pyrex glass is coated with a platinum layer 2, which may be applied in known manner by painting a platinum-containing paste, which is burnt in by heating. The thickness of the layer 2 must be smaller than $1\mu$, and be preferably about $0.1\mu$. It appears that such a thin layer has a great number of pores.

Then the glass cylinder 3, having a wall thickness of for example 2 mms., is slipped onto the metallised rod 1, connected at one end with a vacuum pump and heated from the other end so that the cylinder 3 fused onto the metal layer 2 and seals also with the rod through the pores. The heated zone is shifted along the rod until the whole tube 3 has fused onto the conductor 2.

Subsequently, the conductors as shown in FIG. 2 are severed from the rod in the direction of the arrows 4—4.

From the edge of "Pyrex"-window 6 (FIG. 3) part is ground off, in the resultant opening a conductor 5 as shown in FIG. 2 being sealed therein. Then the window is ground to flatness in the convention manner and polished and sealed in the tube wall 7. The through connection 5 is located outside the picture surface 8 of the window 6.

FIG. 4 shows part of a so-called Plumbicon camera tube. Such a tube is heated several times at about 400 to 500° C., when a tin oxide layer 9 is applied and during degassing. Finally the tube is again heated when the lead oxide layer 10 is applied. The layer 9 is in contact with the conductive layer 2 of the conductor 5. It will be obvious that the head faces of the layer 2 should not contain oxides. On the outer side of the tube the current supply conductor 12 is connected by means of a conductive paste 11 with the conductive layer 2.

In the embodiment shown in FIG. 5 the glass rod 1 has a diameter which slightly exceeds that of the picture surface 8. The conductor 2 need not be applied throughout the circumference of the rod 1, it may have the form of one or more strips. The glass outer layer of the conductor 5 is sealed to the wall 7 of the discharge tube and this need not result in a deformation of the part 1 forming the widow.

Although the invention is only described for a television camera tube, it will be obvious that such a conductor may also be used in other discharge tubes, for example cathode-ray tubes.

What is claimed is:

1. An electric conductor suitable for being sealed in the wall of an electric discharge tube which wall consists of glass having a thermal coefficient of expansion of less than $75 \times 10^{-7}$, said conductor consisting of a rod-shaped body of glass having an expansion coefficient corresponding with that of the tube wall, the surface of said body being coated with a thin porous layer of noble metal having a thickness of less than $1\mu$, and being surrounded by a glass body, the inner side of which adheres to and is sealed through the metal layer to the rod-shaped body.

2. An electric conductor as claimed in claim 1, in which the conductive layer consists of at least one thin metal having a thickness of about $0.1\mu$.

3. An electric conductor as claimed in claim 1 in which the conductive layer consists of a metal selected from the group consisting of gold, platinum and iridium.

4. In a television camera tube having a window with a picture surface, an electric conductor as claimed in claim 1, in which the rod-shaped glass body itself constitutes the picture surface of the window.

5. In a television camera tube having a window about 2 mm. in thickness, a conductor as claimed in claim 1 sealed in said window adjacent an edge thereof.

References Cited

UNITED STATES PATENTS

| | | | |
|---|---|---|---|
| 2,100,187 | 11/1937 | Handrek | 174—50.61 X |
| 2,190,302 | 2/1940 | Waldschmidt | 174—50.61 X |
| 2,269,156 | 1/1942 | Kling | 174—50.61 X |
| 2,409,361 | 10/1946 | Kettlewell | 174—50.64 X |
| 2,562,165 | 7/1951 | Hiensch et al. | 174—50.61 X |

OTHER REFERENCES 346,179    4/1931    Great Britain.

LARAMIE E. ASKIN, *Primary Examiner.*

H. W. COLLINS, *Assistant Examiner.*